United States Patent [19]

Arima

[11] Patent Number: 5,446,998
[45] Date of Patent: Sep. 5, 1995

[54] INTEGRALLY FORMED WEATHER STRIP

[75] Inventor: Hidetoshi Arima, Obu, Japan

[73] Assignee: Tokai Kogyo Kabushiki Kaisha, Aichi, Japan

[21] Appl. No.: 291,845

[22] Filed: Aug. 17, 1994

Related U.S. Application Data

[62] Division of Ser. No. 9,960, Jan. 27, 1993, Pat. No. 5,376,319.

[30] Foreign Application Priority Data

Jan. 31, 1992 [JP] Japan ................................. 4-046139

[51] Int. Cl.⁶ .................................................. E06B 7/16
[52] U.S. Cl. ..................... 49/490.1; 49/476.1; 49/479.1; 49/498.1
[58] Field of Search ................. 49/479.1, 490.1, 498.1, 49/476.1

[56] References Cited

U.S. PATENT DOCUMENTS

| | | | |
|---|---|---|---|
| 4,143,497 | 3/1979 | Offenbacher | 49/490.1 X |
| 4,619,077 | 10/1986 | Azzola et al. | 49/498.1 X |
| 4,960,375 | 10/1990 | Saito et al. | 264/167 |
| 4,976,069 | 12/1990 | Arima et al. | 49/498.1 X |
| 5,067,280 | 1/1991 | Arima | 49/498 |
| 5,110,529 | 5/1992 | Arima | 264/45.9 |
| 5,143,772 | 9/1992 | Iwasa | 264/45.9 |
| 5,162,090 | 11/1992 | Arima | 264/167 |
| 5,240,664 | 8/1993 | Hayashi et al. | 264/167 |
| 5,250,241 | 10/1993 | Iwasa et al. | 264/252 |
| 5,250,248 | 10/1993 | Arima | 264/171 |
| 5,279,782 | 1/1994 | Yamamoto et al. | 264/162 |

FOREIGN PATENT DOCUMENTS

| | | |
|---|---|---|
| 51-577 | 1/1976 | Japan . |
| 62-121030 | 6/1987 | Japan . |
| 1-242225 | 9/1989 | Japan . |
| 1-154947 | 10/1989 | Japan . |
| 2-80211 | 3/1990 | Japan . |

*Primary Examiner*—Philip C. Kannan
*Attorney, Agent, or Firm*—Dennison, Meserole, Pollack & Scheiner

[57] ABSTRACT

A weather strip having first and second weather strip sections integrally formed as a unit. Each of the weather strip sections includes a sealing portion and an engagement portion. The sealing portion and the engagement portion of each of the weather strip sections are formed of first and second molding materials, respectively. The sealing portion of the first weather strip section having a cross-sectional configuration which is different from the sealing portion of the second weather strip section. The second weather strip section is harder than the first section.

7 Claims, 15 Drawing Sheets

INTEGRALLY FORMED WEATHER STRIP

This application is a divisional of Ser. No. 08/009,960, filed Jan. 27, 1993 and allowed Jul. 1, 1994 now U.S. Pat. No. 5,376,319.

BACKGROUND OF THE INVENTION

The present invention relates to a weather strip and specifically to a process for manufacturing the same. More particularly, the invention relates to an irregularly shaped weather strip or a weather strip which includes a plurality of sections having different cross-sectional configurations and process for manufacturing the same, A body of an automobile is provided with a weather strip along a door opening. The weather strip may seal a clearance formed between the door and the body when the door is closed so that entry of raindrops and the like is effectively prevented.

As shown in FIGS. 20 and 21, the conventional weather strip W' includes a sealing portion Ws' and an engagement portion Wa'. The weather strip W' is integrally formed and has a uniform cross-sectional configuration. The weather strip W' is arranged along a front pillar P' (FIG. 20) and a roof panel R' (FIG. 21) of an automobile body 4'.

The sealing portion Ws' of the weather strip W' has a groove 53 extending longitudinally therealong. Therefore, a gutter G' is formed along the front pillar P' and the roof panel R' when the weather strip W' is mounted on the automobile body 4'. The gutter G' may lead rainwater from the roof panel R' to effectively prevent the rainwater from flowing toward a side window.

However, the gutter G' extending along the front pillar P' may cause increased resistance of the air and increased sound emission therefrom during travel of the automobile.

In order to solve these problems resulting from the gutter G' extending along the front pillar P', a more recent weather strip W" includes a first section W"1 to be positioned along a front pillar P" of an automobile body 4" and a second section W"2 to be positioned along a roof panel R" of the body 4", as shown in FIGS. 22 and 23. The first section W"1 includes a first engagement portion Wa1" and a first sealing portion Ws1". The second section W"2 includes a second engagement portion Wa2" and a second sealing portion Ws2". As will be observed from FIGS. 22 and 23, the cross-sectional configuration of the first sealing portion Ws1" is different from that of the second sealing portion Ws2". As shown therein, only the second sealing portion Ws2" of the second section W"2 has a groove 153 extending longitudinally therealong. Therefore, when the weather strip W" is mounted on the automobile body 4", a gutter G" is formed along the roof panel R" whereas no gutter is formed along the front pillar P".

Such an irregularly shaped weather strip W" is manufactured by a process which comprises the steps of separately molding the sections W"1, W"2 by an extrusion procedure and subsequently bonding the sections W"1, W"2 at the ends thereof.

However, the irregularly shaped weather strip W" manufactured by the process exhibits undesirable awkward appearance because of a joining portion formed thereon.

Further, such a process includes a large number of steps since the sections W"1, W"2 are separately formed, thereby causing increased working time and labor cost.

Some improved weather strips and processes for manufacturing the same are found, for example, in Japanese Laid-Open Patent Publications Nos. 62-121030 and 1-242225, and Japanese Laid-Open Utility Model Publication No. 1-154947. Each of the weather strips is an irregularly shaped weather strip which exhibits good appearance because of the absence of a joining portion. Further, each of the processes may permit continuous manufacture of the irregularly shaped weather strip. Therefore, these weather strips and the processes may to some extent solve the above-described problems.

However, in each of the weather strips, the cross-sectional configuration of one section does not greatly differ from that of the other section. Also, each of the processes does not permit formation of a weather strip including two sections of which the cross-sectional configurations are greatly different from each other.

SUMMARY OF THE INVENTION

It is an object of the invention to provide an irregularly shaped weather strip including two sections of which the cross-sectional configurations are greatly different from each other.

It is another object of the invention to provide a manufacturing process which may permit formation of the weather strip including two sections of which the cross-sectional configurations are greatly different from each other.

According to the present invention, there is provided an irregularly shaped weather strip having first and second weather strip sections integrally formed as a unit, each of the first and second weather strip sections including a sealing portion and an engagement portion, the sealing portion and the engagement portion of each of the first and second weather strip sections being formed of different kinds of materials, respectively, the sealing portion of the first weather strip section having a cross-sectional configuration different from that of the sealing portion of the second weather strip section.

According to the present invention, there is provided a process for manufacturing an irregularly shaped weather strip which comprises the steps of providing a molding die having an extruding opening of which the configuration corresponds to the cross-sectional configuration of a first weather strip section; extruding first and second molding materials from the extruding opening for forming a molding product, thereby to produce a first weather strip section including a sealing portion formed of the first molding material and an engagement portion formed of the second molding material over a desired length; extruding the first and second molding materials from the extruding opening for forming a molding product; and continuously modifying the cross-sectional configuration of a portion formed of the first molding material and heating the modified portion, thereby to produce a second weather strip section including a sealing portion formed of the first molding material and an engagement portion formed of the second molding material over a desired length.

An important feature of the present invention is that the weather strip includes two sections of which the cross-sectional configurations are greatly different from each other.

Another feature of the present invention is that the process may permit formation of the weather strip including two sections of which the cross-sectional configurations are greatly different from each other.

The present invention will become more fully apparent from the claims and the description as it proceeds in connection with the drawings.

Figure 2:
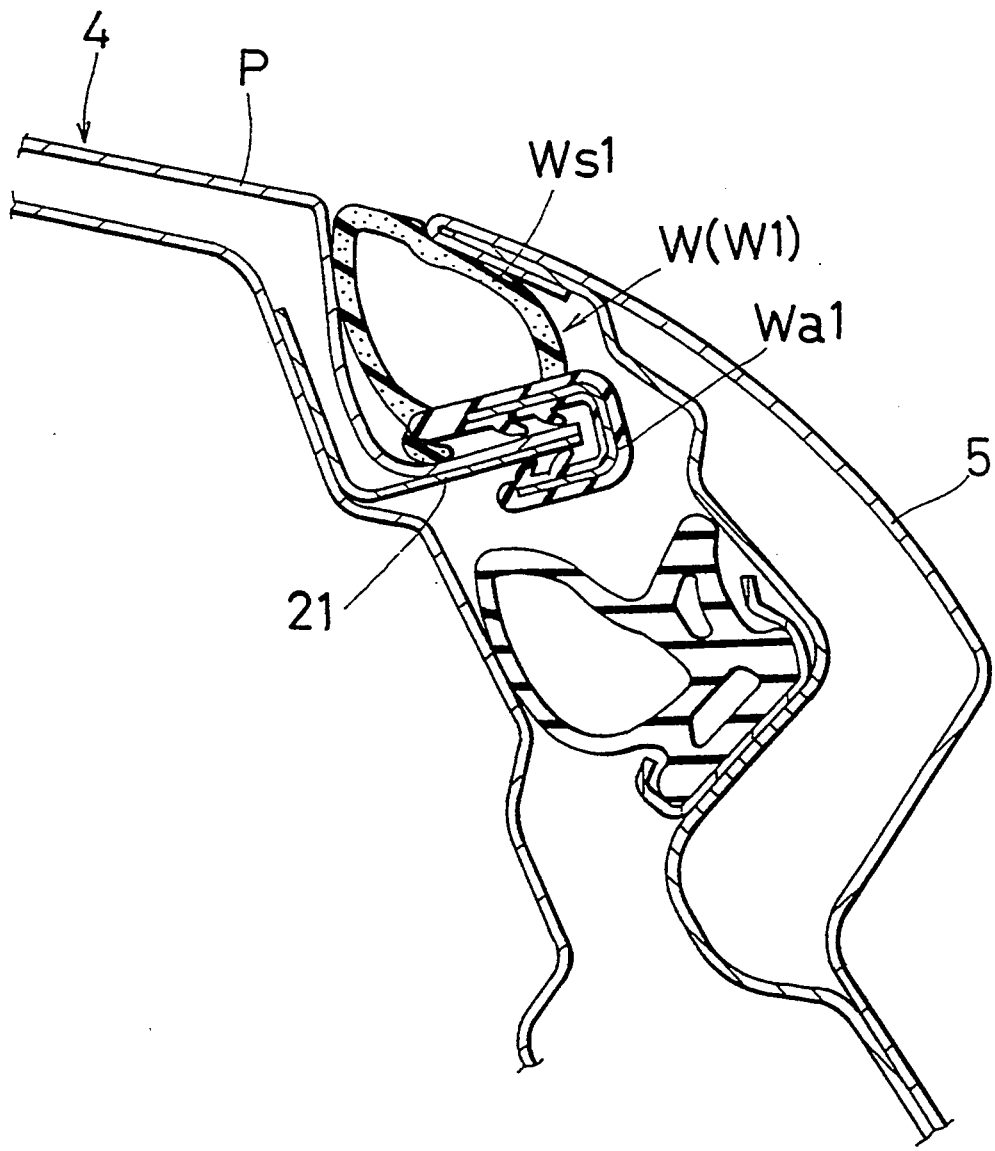
FIG. 2 is a sectional view taken along lines II—II of FIG. 1.
Figure 3:
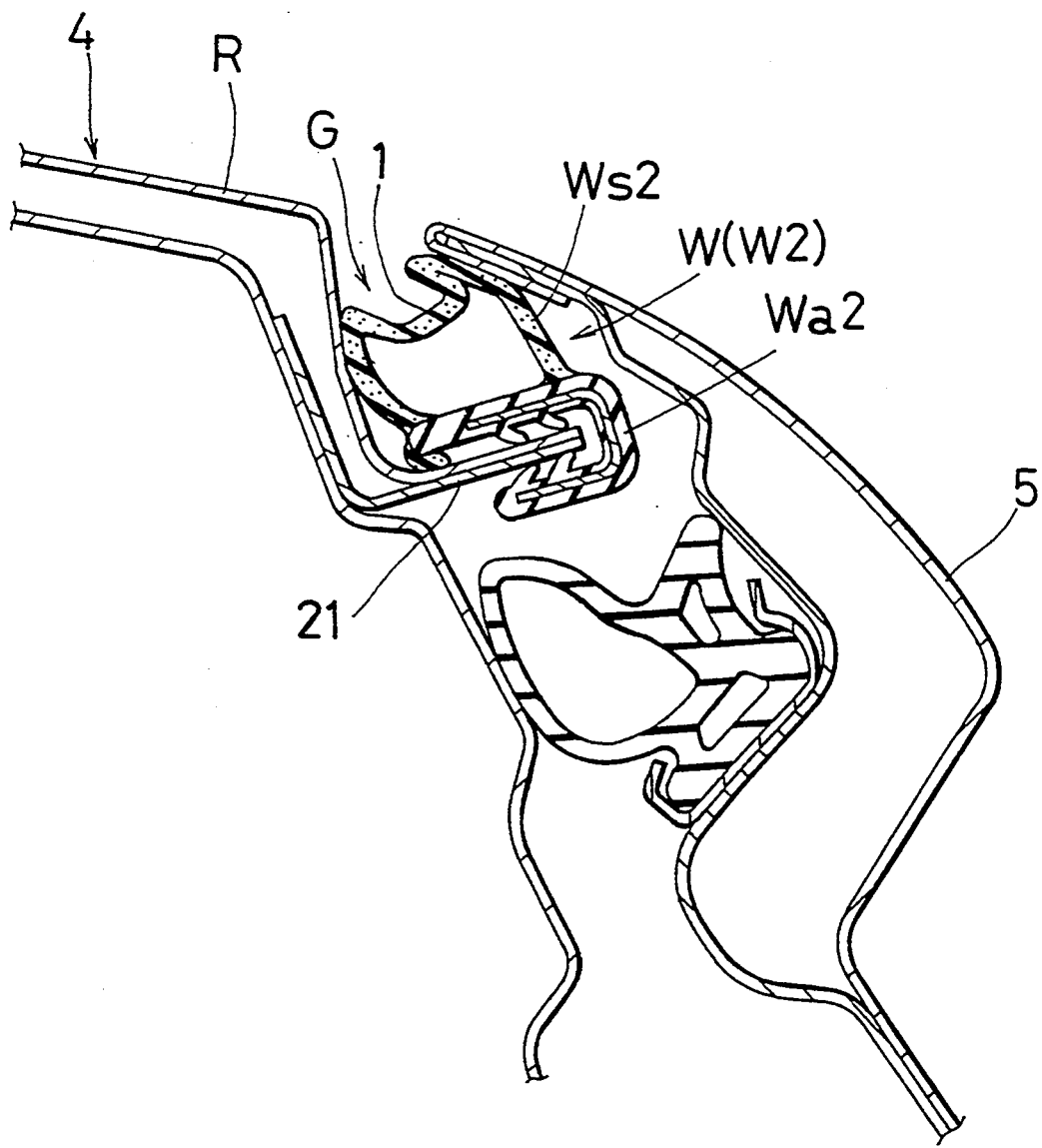
FIG. 3 is a sectional view taken along lines III—III of FIG. 1.
Figure 14:
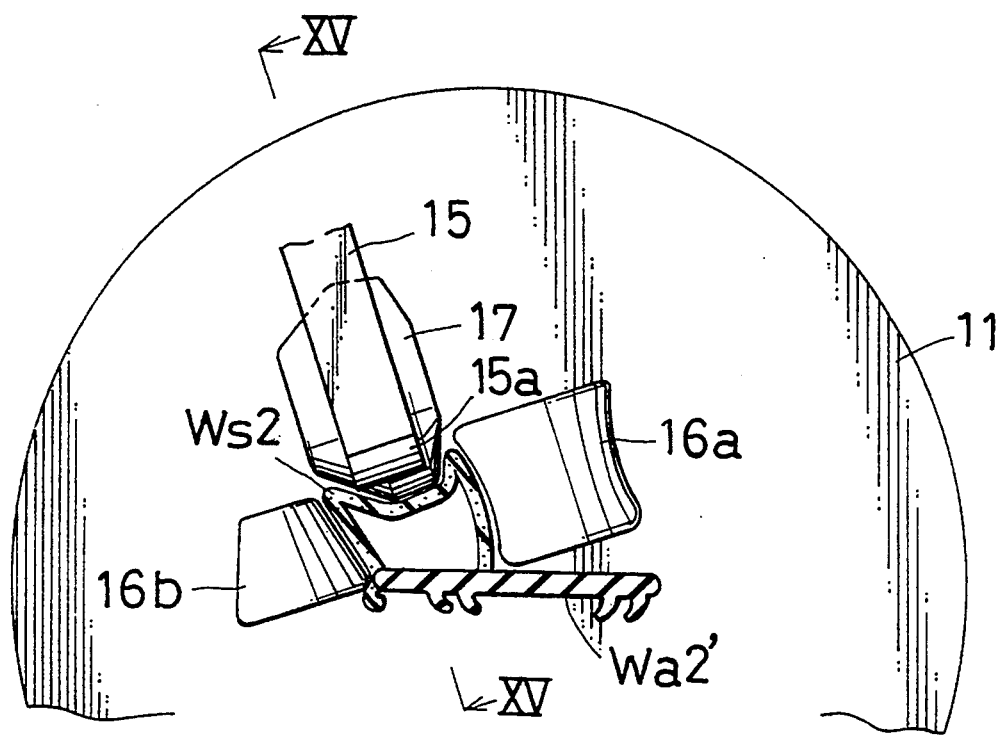
FIG. 14 is a schematic elevational view of apparatus according to the second embodiment of the present invention under the condition that the second section of the weather strip is being molded.
Figure 16:
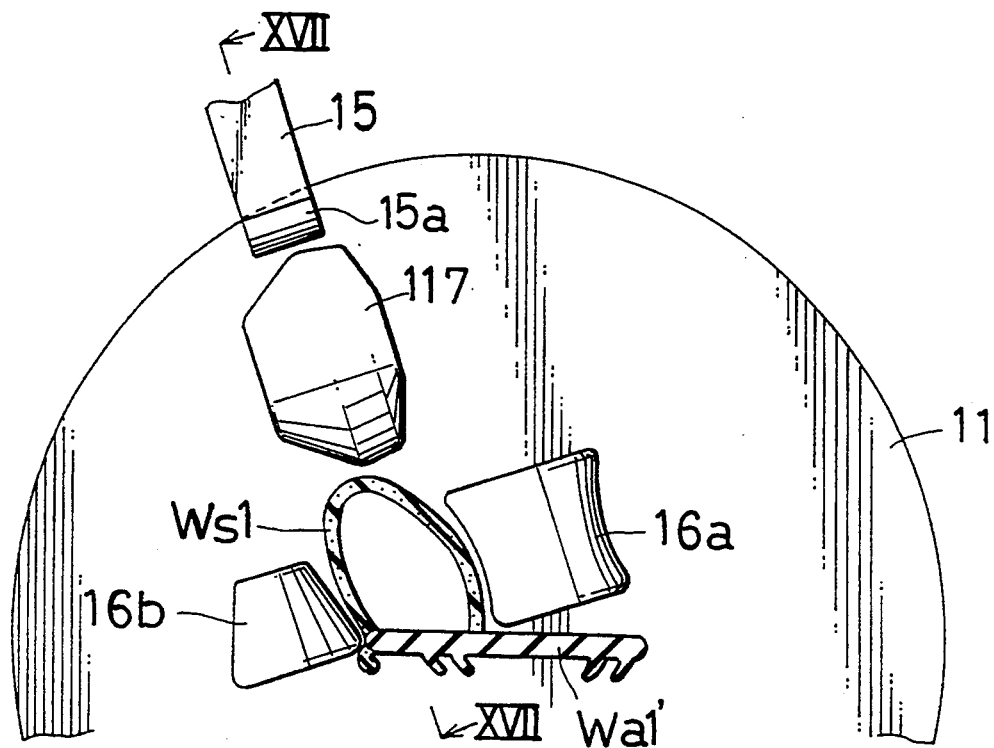
Figure 17:
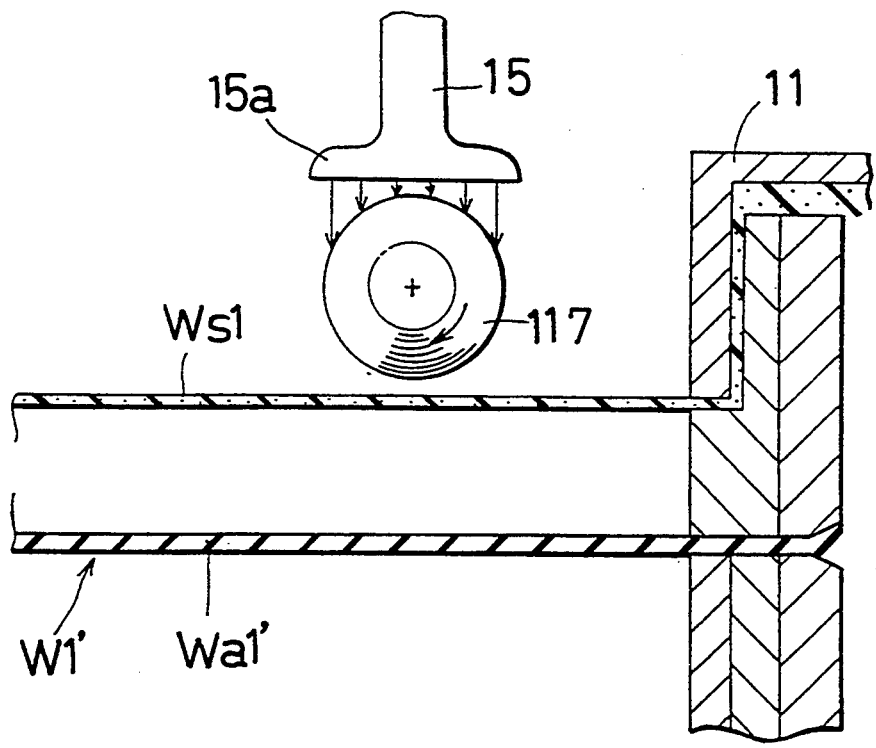
Figure 18:
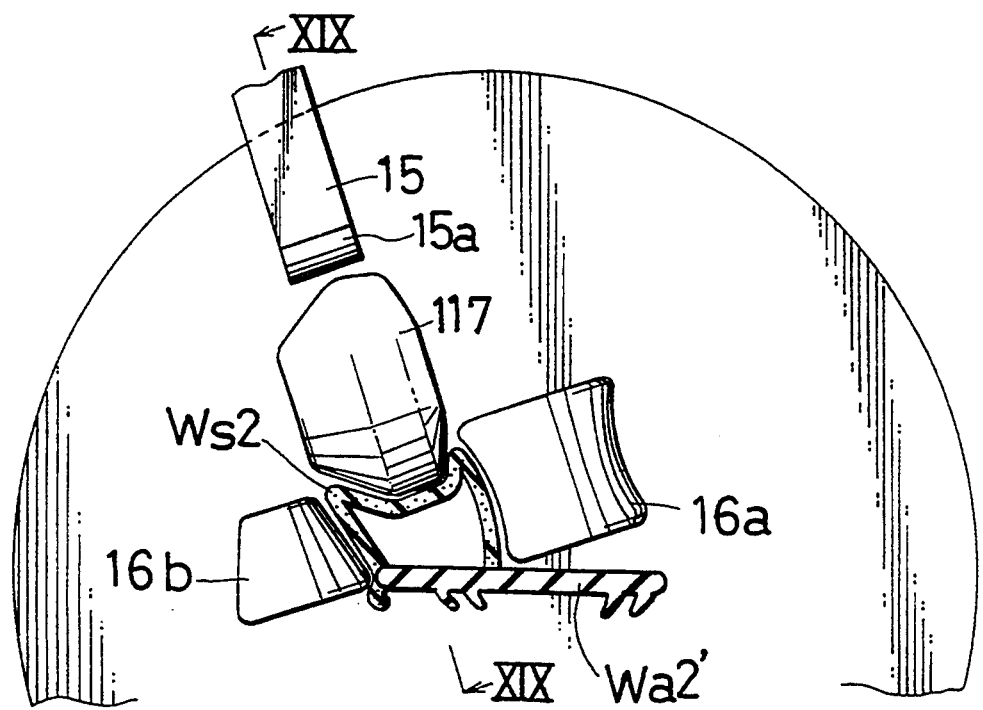
Figure 19:
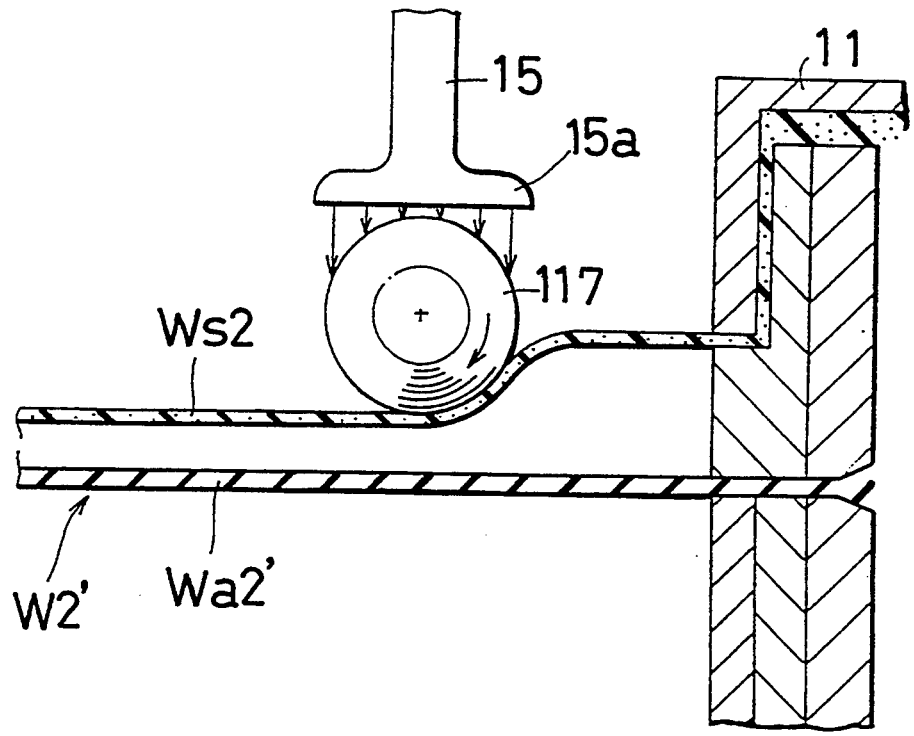
Figure 20:
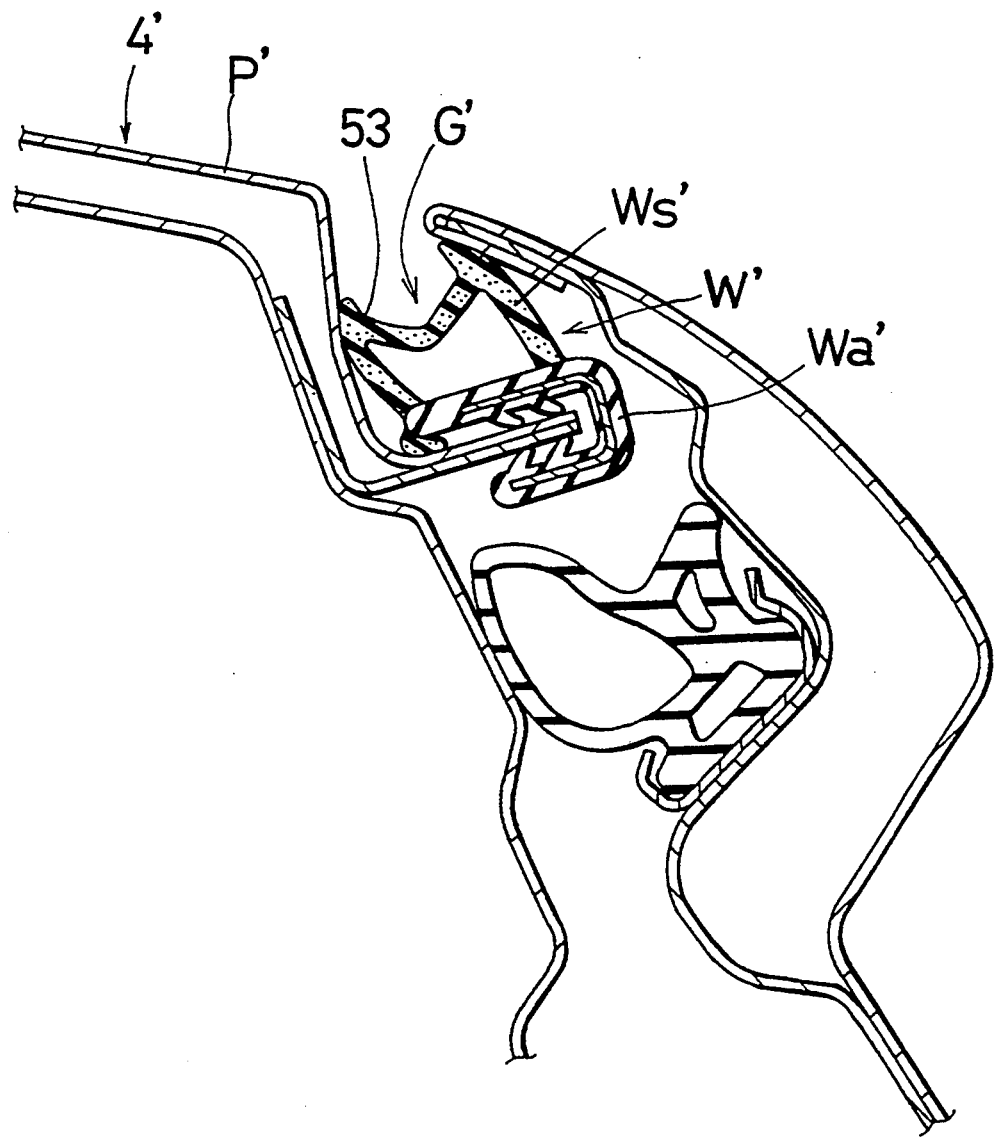
Figure 21:
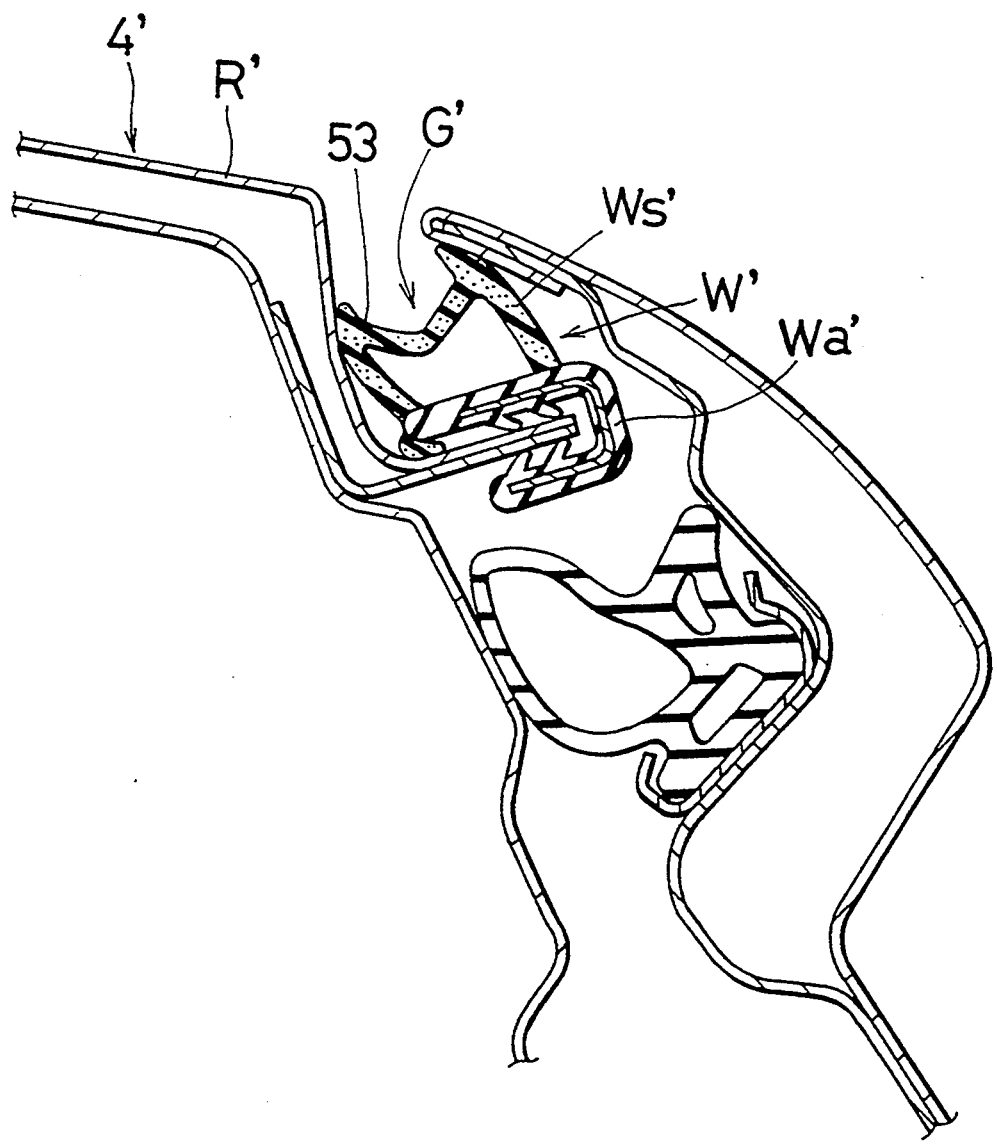
Figure 22:
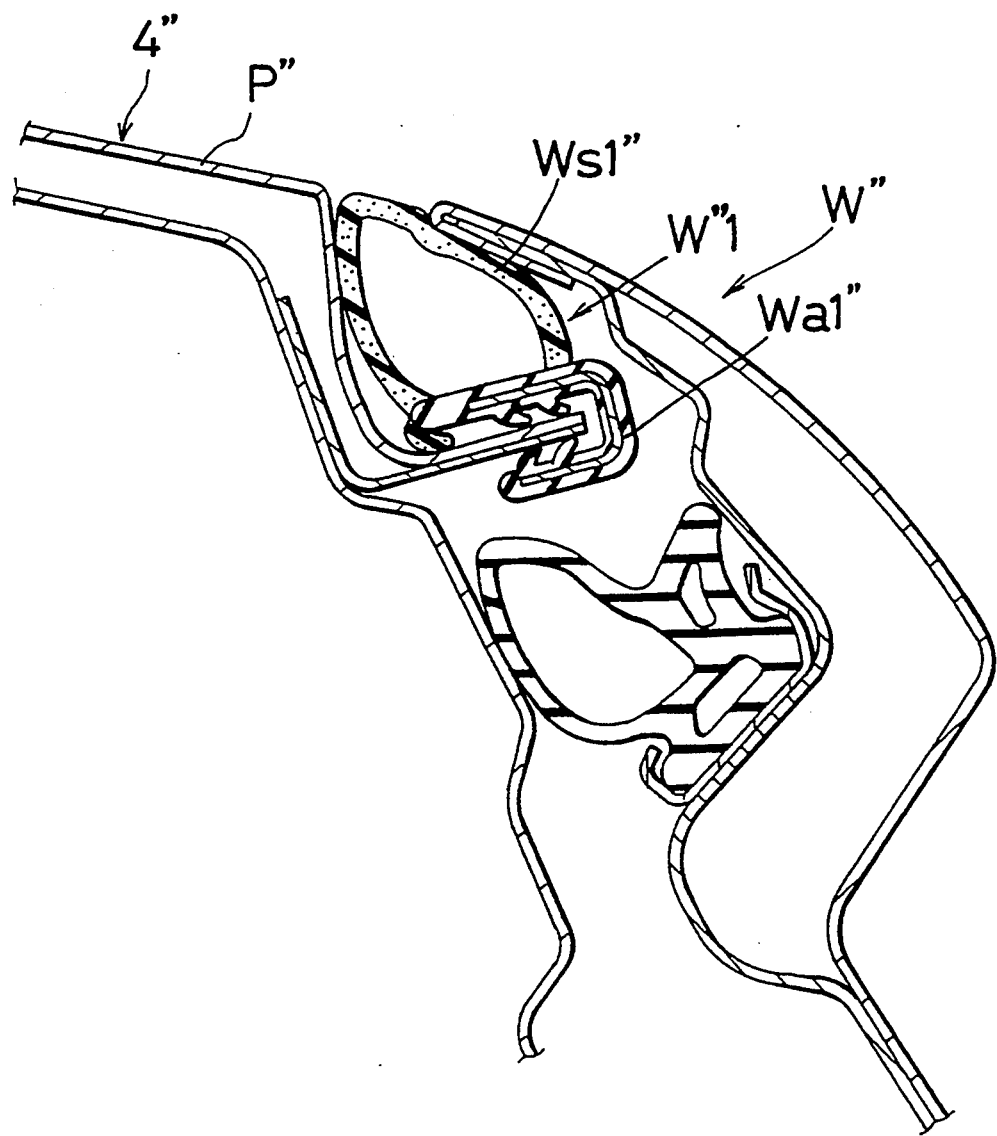
Figure 23:
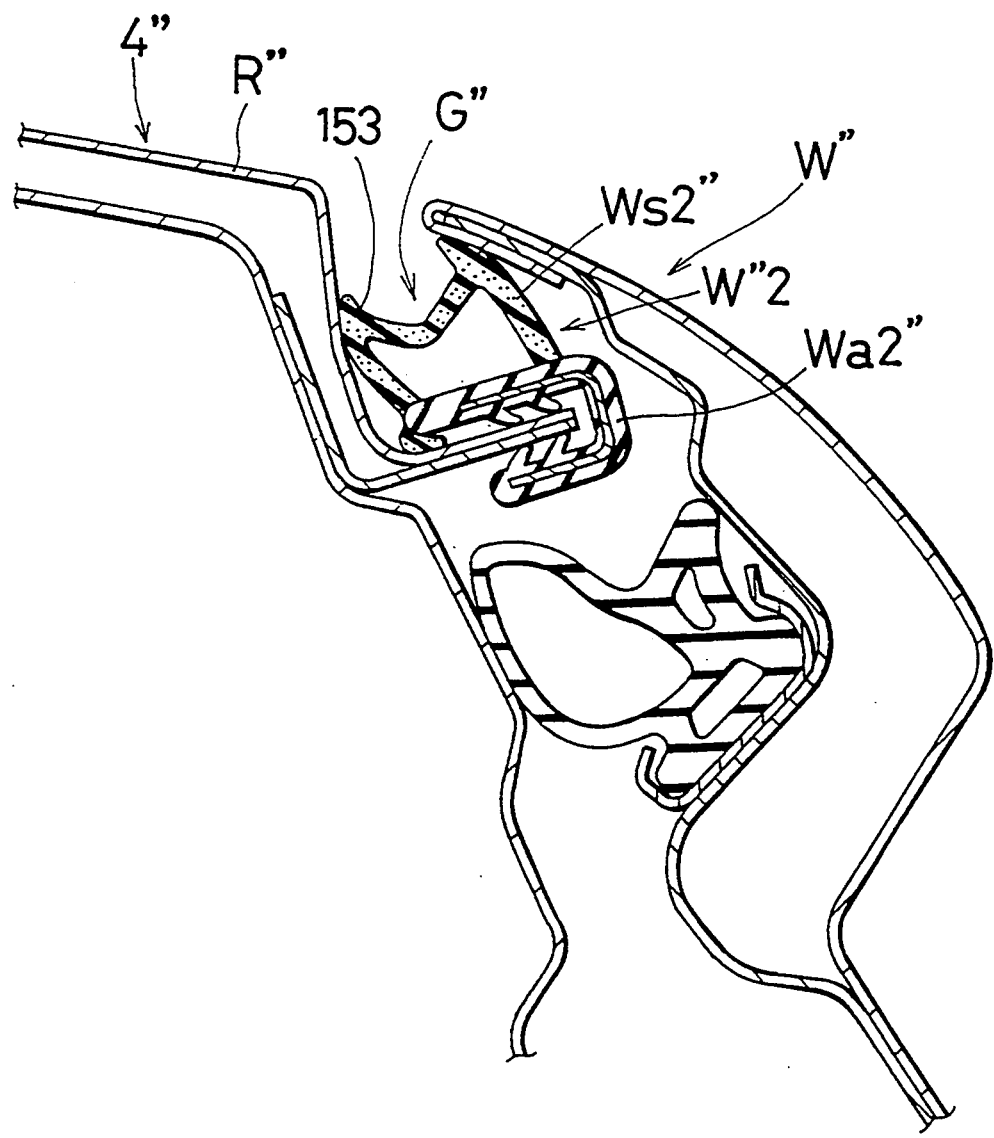

FIG, 15 is a sectional view taken along lines XV—XV of FIG. 14;

FIG. 16 is a schematic elevational view of apparatus according to a third embodiment of the present invention under the condition that the first section of the weather strip is being molded;

FIG. 17 is a sectional view taken along lines XVII—XVII of FIG. 16;

FIG. 18 is a schematic elevational view of apparatus according to the third embodiment of the present invention under the condition that the second section of the weather strip is being molded;

FIG. 19 is a sectional view taken along lines XIX—XIX of FIG. 18;

FIG. 20 is a view similar to FIG. 2 in which the door is provided with a conventional weather strip;

FIG. 21 is a view similar to FIG. 3 in which the door is provided with a conventional weather strip;

FIG. 22 is a view similar to FIG. 20 in which the door is provided with an improved conventional weather strip;

FIG. 23 is a view similar to FIG. 21 in which the door is provided with an improved conventional weather strip;

DETAILED DESCRIPTION OF THE PREFERRED EMBODIMENT

Referring now to FIGS. 2, 3, 8 and 9, shown therein is an irregularly shaped weather strip W according to the present invention which is applicable to a body 4 of an automobile. Further, for convenience in terminology, the irregularly shaped weather strip will be called a "weather strip" in the following description.

Figure 8:
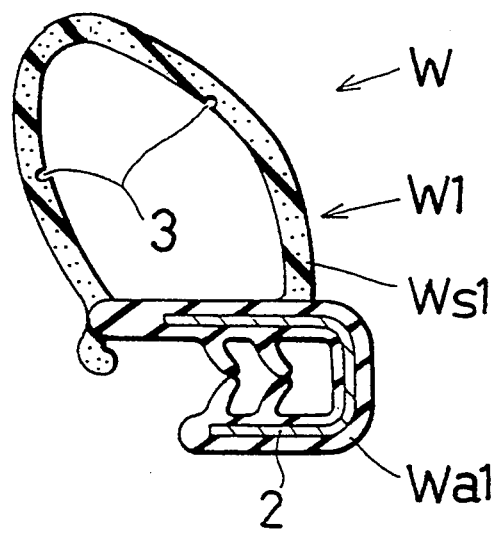
FIG. 8 is a sectional view of the first section.
Figure 9:
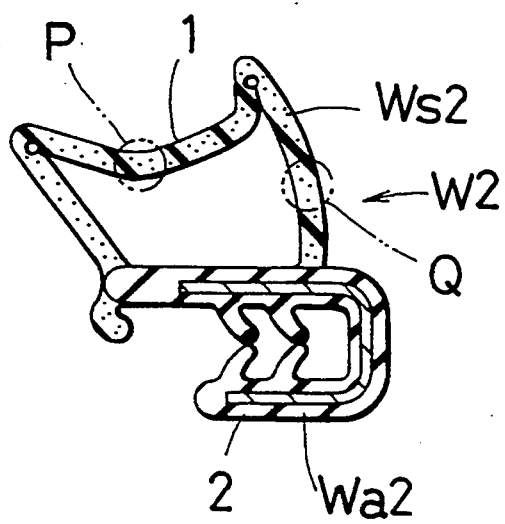
FIG. 9 is a sectional view of the second section.

The weather strip W has a first section W1 and a second section W2 integrally formed with the first section W1. As best shown in FIGS. 8 and 9, the first section W1 includes a first engagement portion Wa1 and a first tubular sealing portion Ws1 integrally formed with the first engagement portion Wa1. The second section W2 includes a second engagement portion Wa2 and a second tubular sealing portion Ws2 integrally formed with the second engagement portion Wa2. The engagement portions Wa1, Wa2 and the sealing portions Ws1, Ws2 are generally formed of a semi-hard rubber and a sponge rubber, respectively. As will be observed from FIGS. 8 and 9, the cross-sectional configuration of the first sealing portion Ws1 is different from that of the second sealing portion Ws2. The first sealing portion Ws1 has substantially an oval-shaped cross-sectional configuration (FIG. 8) whereas the second sealing portion Ws2 has substantially a rectangular configuration in cross-section and has an outer groove 1 formed thereon (FIG. 9). Further, each of the first and second engagement portions Wa1, Wa2 has substantially a U-shaped cross-sectional configuration and is reinforced by a reinforcement bar 2 embedded therein.

Figure 1:
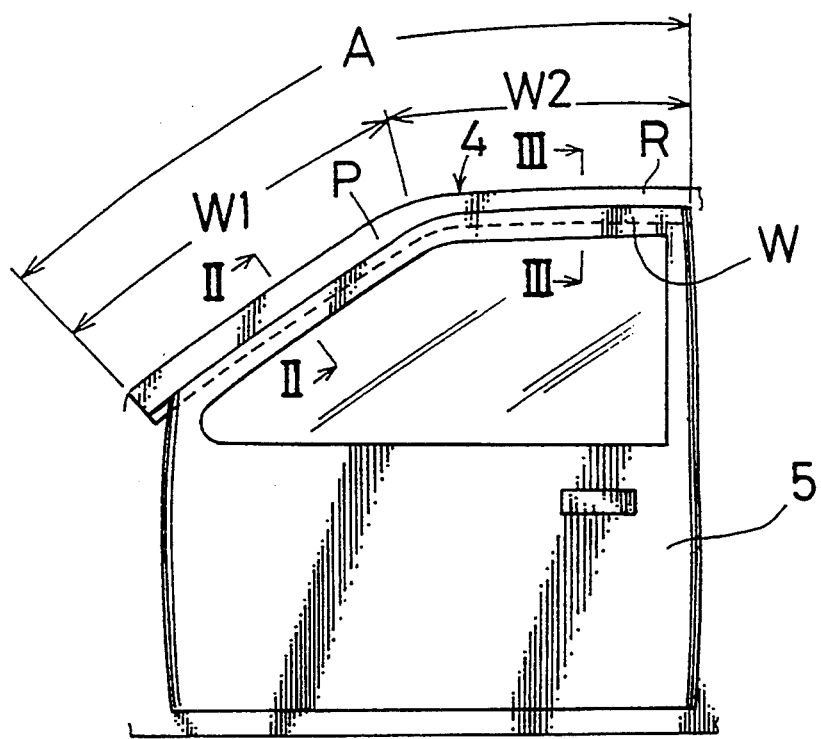
FIG. 1 is a fragmentary plan view of an automobile body which is provided with a weather strip of the present invention.

As shown in FIGS. 1 to 3, the weather strip W is mounted on the body 4 by engaging the first and second engagement portions Wa1, Wa2 with a flanged portion 21 formed on the body 4 so that the first and second sections W1, W2 of the weather strip W are positioned along a front pillar P and a roof panel R of the body 4, respectively. As will be observed from FIGS. 2 and 3, since the second sealing portion Ws2 of the second section W2 has the groove 1, a gutter G is formed along the roof panel R. The gutter G effectively guides rainwater from the roof panel R. However, since the first sealing portion Ws1 of the first section W1 has no groove, no gutter is formed along the front pillar P. This may permit reduced sound emission during travel of the automobile.

Referring now to FIGS. 4 to 7, shown therein is apparatus for manufacturing the weather strip W according to a first embodiment of the invention.

The apparatus includes a molding die 11. The front end surface of the molding die 11 is formed with an opening 12. The opening 12 has a configuration substantially corresponding to the cross-sectional configuration of an original first section W1' of an original weather strip W'. As will be observed from these drawings, the original first section W1' substantially corresponds to the first section W1 of the weather strip W, provided that an original first engagement portion Wa1' is not bent to a U-shaped configuration in cross-section. The molding die 11 has a pair of conduits 13, 14 communicated with the opening 12. The conduits 13, 14 are also communicated with a feed pipe (not shown) for feeding molten semi-hard rubber M1 and a second feed pipe (not shown) for feeding molten sponge rubber M2, respectively. The apparatus also includes a hot air blower 15 and a pair of corresponding guide rollers 16a, 16b positioned in front of the molding die 11. The blower 15 is arranged so as to move toward and away from a molding product extruded from the opening 12. The blower 15 has a nozzle portion 15a longitudinally extending along the molding product extruded from the opening 12. The guide rollers 16a, 16b are arranged so as to guide the side surfaces of the molding product.

The weather strip W is manufactured by the above-described apparatus.

Figure 4:
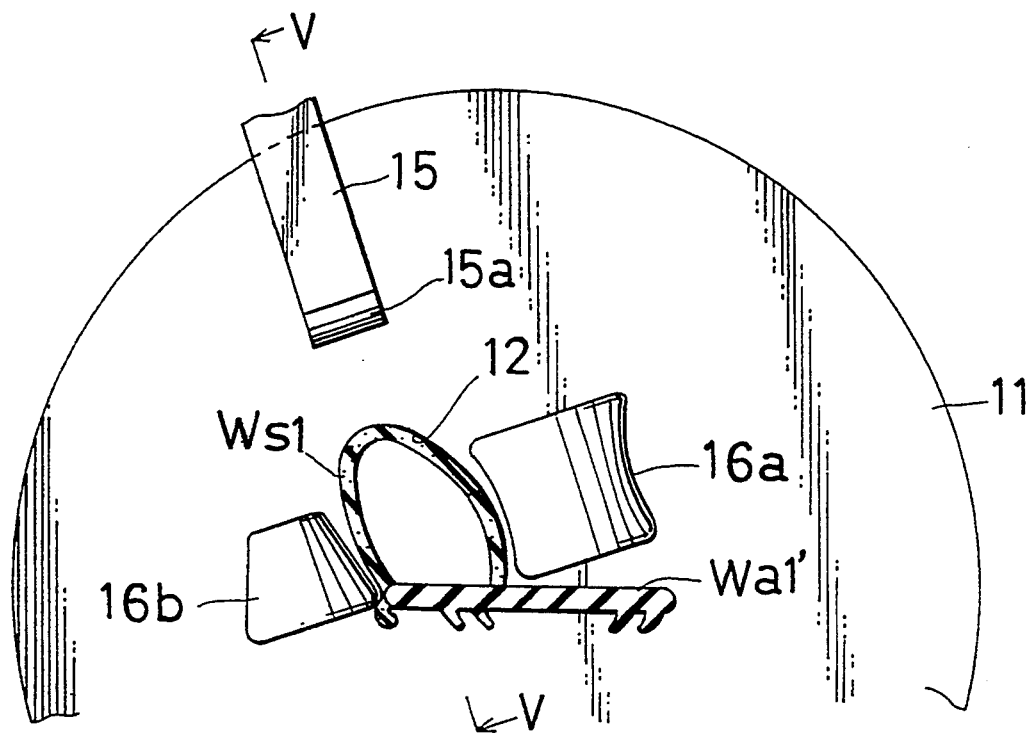
FIG. 4 is a schematic elevational view of apparatus according to a first embodiment of the present invention under the condition that a first section of the weather strip is being molded.
Figure 5:
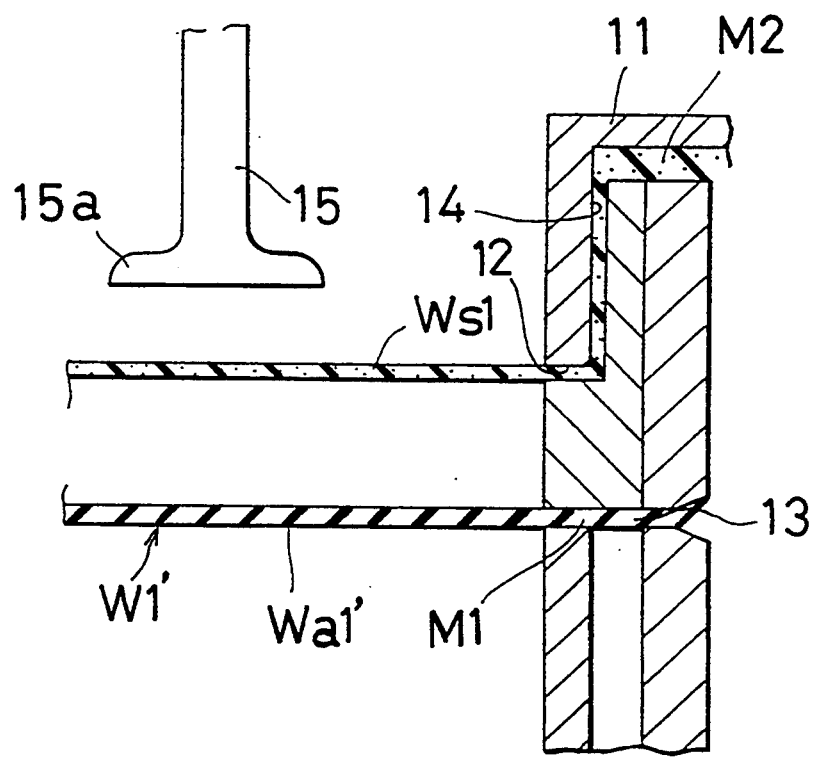
FIG. 5 is a sectional view taken along lines V—V of FIG. 4.

In a typical operation to form the weather strip W, as shown in FIGS. 4 and 5, the molten semi-hard rubber M1 and the molten sponge rubber M2 are simultaneously extruded from the opening 12 of the molding die 11, thereby to continuously form the molding product which includes a portion formed of sponge rubber and a portion formed of semi-hard rubber. The molding product is used as the original first section W1'. The original first section W1' includes the first sealing portion Ws1 formed of sponge rubber and the original first engagement portion Wa1' formed of semi-hard rubber. In this step, the blower 15 is apart from the molding product and is turned off. This step is continued until the desired length of the original first section W1' is obtained.

Figure 6:
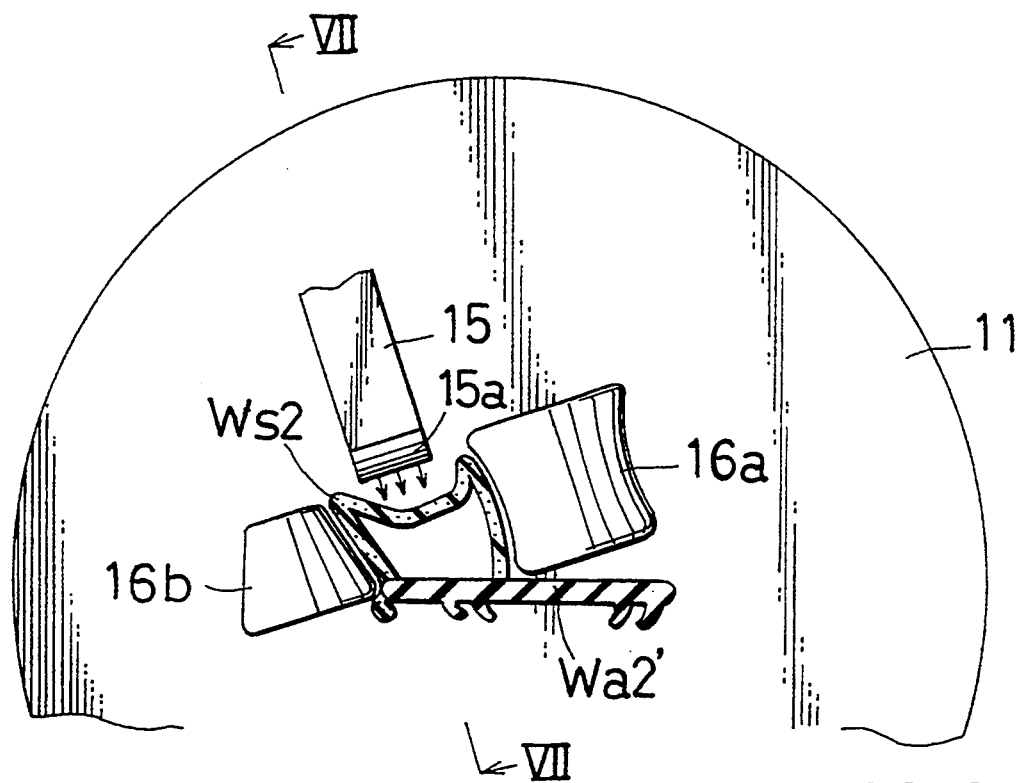
FIG. 6 is a schematic elevational view of the apparatus according to the first embodiment of the present invention under the condition that a second section is being molded.
Figure 7:
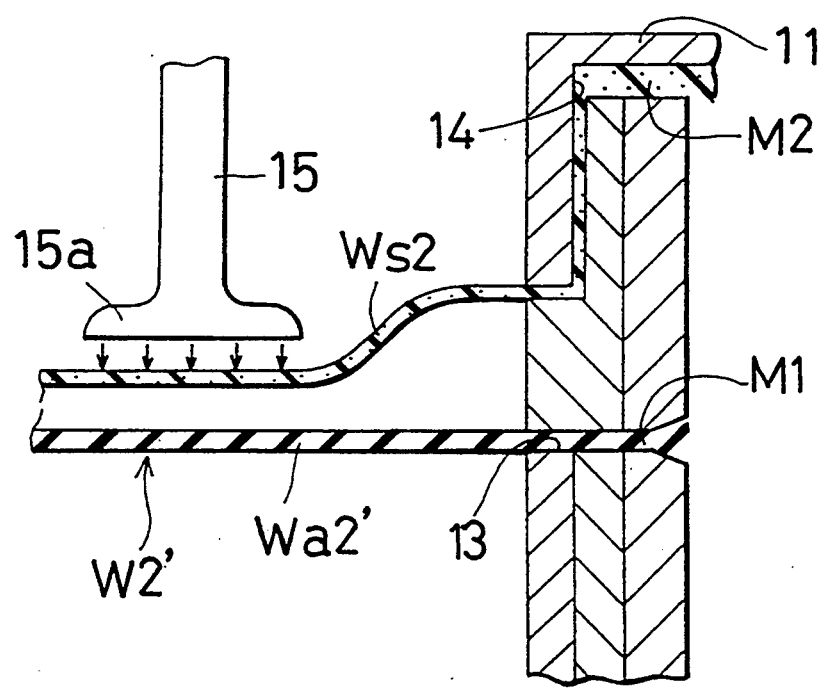
FIG. 7 is a sectional view taken along lines VII—VII of FIG. 6.

After the step for forming the original first section W1' is completed, as shown in FIGS. 6 and 7, the blower 15 is moved toward the following molding product and is turned on to blow hot air from the nozzle portion 15a onto the upper surface of the portion formed of sponge rubber of the molding product. The hot air used herein has a temperature ranging from 400° to 800° C. When the hot air is blown, the portion formed of sponge rubber of the molding product is modified and is hardened at the same time, thereby to form an original second section W2' which includes the second sealing portion Ws2 formed of sponge rubber and an original second engagement portion Wa2' formed of semi-hard rubber. Further, to facilitate modification of the portion formed of sponge rubber of the molding product, grooves 3 can be longitudinally formed on such a portion, as shown in FIGS. 8 and 9. Such grooves 3 can be easily formed on the portion formed of the sponge rubber by partly modifying the configuration of the opening 12 of the molding die 11. As will be observed from these drawings, the original second section W2' as formed substantially corresponds to the second section W2 of the weather strip W, provided that the original second engagement portion Wa2' is not bent to a U-shaped configuration in cross-section. In this step, the guide rollers 16a, 16b act as forming means for effectively preventing excessive deformation of the portion formed of sponge rubber of the molding product. Therefore, the second sealing portion Ws2 has a substantially predetermined cross-sectional configuration. Further, as will be appreciated, the original second section W2' is integrally connected with the original first section W1'. This step is continued until the desired length of the original second section W2' is obtained.

Thus, an original weather strip W' including the original first and second sections W1', W2' is continuously formed. Thereafter, the original first and second engagement portions Wa1', Wa2' are longitudinally bent to a U-shaped cross-sectional configuration, thereby to form the weather strip W including the first and second sections W1, W2. Further, bending of the flat engagement portions Wa1', Wa2' is carried out by using a conventional bending machine (not shown).

Figure 10:
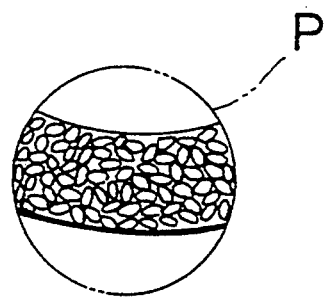
FIG. 10 is an enlarged view of a portion P of FIG. 9.
Figure 11:
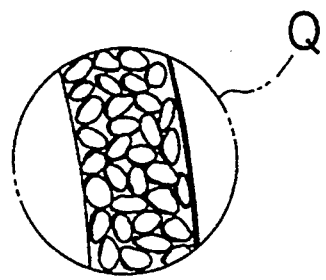
FIG. 11 is an enlarged view of a portion Q of FIG. 9.

The molten sponge rubber used herein is of a vulcanized molten rubber containing a foaming agent. Such a molten rubber cures with a gas produced from the foaming agent contained therein, thereby to form the sponge rubber. As will be easily understood, increasing the quantity of the gas contained in the sponge rubber will reduce hardness of the sponge rubber. Conversely, if the quantity of the gas contained in the sponge rubber is reduced for some reasons, the hardness of the sponge rubber will be increased, that is, the expansion ratio of the sponge rubber will be reduced. In this invention, the hot air having a temperature ranging from 400° to 800° C. is applied to form the second sealing portion Ws2. Such a hot air may rapidly soften the sponge rubber to degas the sponge rubber. Therefore, as shown in FIGS. 10 and 11, the portion treated by the hot air will have a hardness greater than that of the other portion because of the reduced expansion ratio.

Some embodiments modified from the first embodiment will now be described with reference to the FIGS. 12 to 15 and 16 to 19, wherein only parts different from those shown in FIGS. 4 to 7 will be explained.

FIGS. 12 to 15 shows apparatus according to a second embodiment of the invention. The apparatus includes a forming roller 17 positioned between the blower 15 and the molding die 11. The forming roller 17 is arranged so as to move toward and away from the molding product extruded from the opening 12. The forming roller 17 has a peripheral edge of which the cross-sectional configuration substantially corresponds to that of the outer groove 1 of the second sealing portion Ws2.

Figure 12:
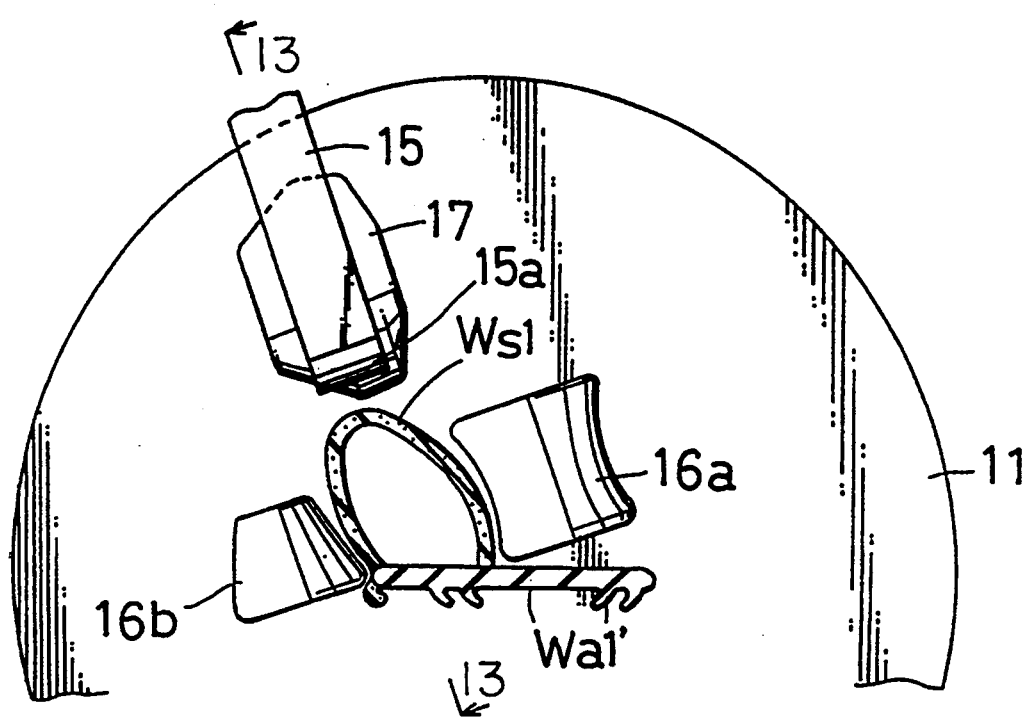
FIG. 12 is a schematic elevational view of apparatus according to a second embodiment of the present invention under the condition that the first section of the weather strip is being molded.
Figure 13:
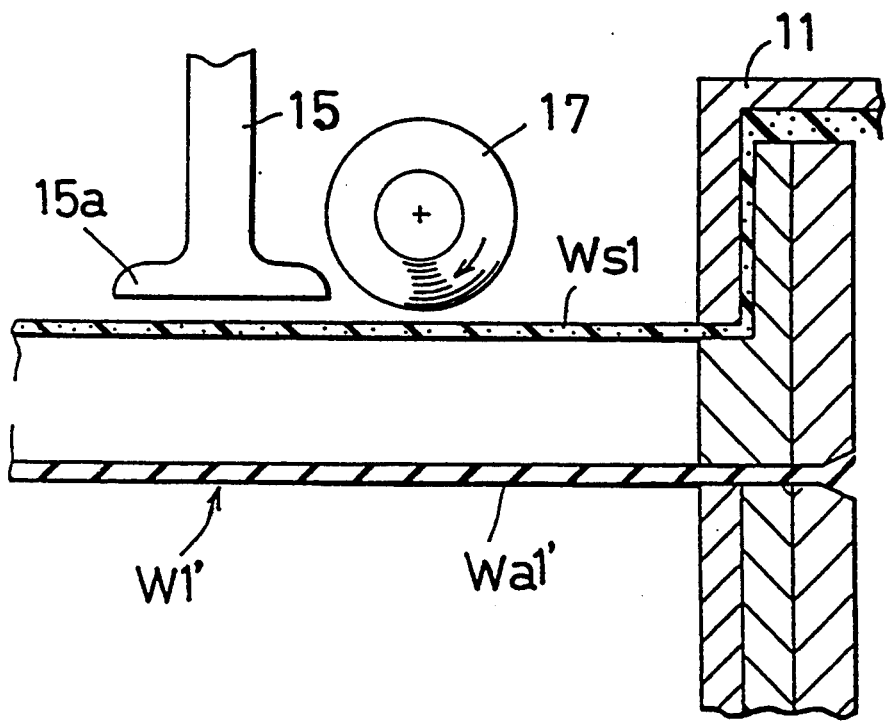
FIG. 13 is a sectional view taken along lines XIII—XIII of FIG. 12.

In a step to form the original first section W1', as shown in FIGS. 12 and 13, the forming roller 17 is apart from the molding product extruded from the opening 12.

Figure 15:
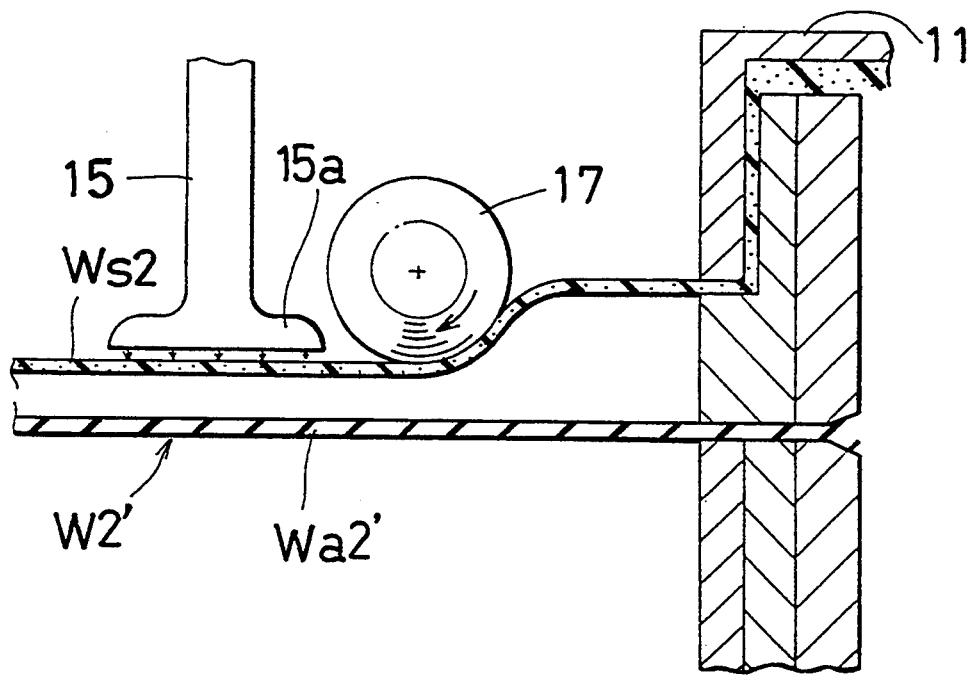

In a step to form the original second section W2', as shown in FIGS. 14 and 15, the forming roller 17 is moved toward the following molding product together with the blower 15. The forming roller 17 engages the portion formed of sponge rubber of the molding product to modify the cross-sectional configuration thereof, thereby to form the original second section W2' which includes the second sealing portion Ws2 and an original second engagement portion Wa2'. Thereafter, the hot air blown from the nozzle 15a of the blower 15 is applied on a part of the second sealing portion Ws2 to harden the same. As will be easily understood, since the hot air is used only to heat and harden a part of the second sealing portion Ws2, reduced air pressure can be used. Further, an extreme infra-red ray heater can be used to heat and harden a part of the second sealing portion Ws2.

Although the blower 15 is adapted to apply the hot air on a part of the second sealing portion Ws2, the blower 15 can be designed to heat all the portion of the second sealing portion Ws2 or all of the original second section W2'. Further, the blower 15 can be adapted to be turned on even when the first original section W1' is formed, so that the hardness of the first sealing portion Ws1 is also enhanced.

FIGS. 16 to 19 shows apparatus according to a third embodiment of the invention. The apparatus includes a forming roller 117. The forming roller 117 is positioned under the blower 15 so as to be heated by the hot air blown from the blower 15. The forming roller 117 is arranged so as to move toward and away from the molding product extruded from the opening 12 together with the blower 15. The forming roller 117 has a peripheral edge of which the cross-sectional configuration substantially corresponds to that of the outer groove i of the second sealing portion Ws2.

In a step to form the original first section W1', as shown in FIGS. 16 and 17, the blower 15 and the forming roller 117 are apart from the molding product extruded from the opening 12. In this step, the blower 15 is turned on for preheating the forming roller 117.

In a step to form the original second section W2', as shown in FIGS. 18 and 19, the forming roller 117 is moved toward the following molding product together with the blower 15. The forming roller 117 engages the portion formed of sponge rubber of the molding product to modify the cross-sectional configuration thereof, thereby to form the original second section W2' which includes the second sealing portion Ws2 and an original second engagement portion Wa2'. As will be easily understood, since the forming roller 117 is previously heated, the forming roller 117 may modify the portion formed of sponge rubber of the molding product and may simultaneously harden the same.

In this embodiment, the blower 15 is used only to preheat the forming roller 117. Therefore, the blower 15 can be replaced with a desired heating means (not shown) which is assembled to the forming roller 117.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A particularly shaped weather strip for use on an automobile body to seal a clearance formed between an automobile door and a door opening of the body, comprising first and second weather strip sections integrally formed as a single unit, each of said first and second weather strip sections including a sealing portion to seal said clearance and an engagement portion to be engaged with the body, said sealing portion and said engagement portion of each of said first and second weather strip sections being of different kinds of materials, respectively, said sealing portion of said first weather strip section has a substantially oval cross-sectional configuration, and said sealing portion of said second weather strip section has a substantially depressed rectangular cross-sectional configuration.

2. The weather strip as defined in claim 1, wherein said sealing portion and said engagement portion of each of said first and second weather strip sections are of sponge rubber and semi-hard rubber, respectively.

3. An elongate weather strip for use on an automobile body to seal the entire clearance formed between an automobile door and the door opening of the body, comprising a first and a second weather strip section integrally formed as a single unit, each of said first and second weather strip sections including a sealing portion to seal said clearance and an engagement portion to be engaged with the body, said sealing portion and said engagement portion of each of said first and second weather strip sections having a different hardness and the sealing portion of said first weather strip section being formed with an upper substantially oval cross-sectional configuration, and the sealing portion of said second weather strip section includes a substantially rectangular cross sectional configuration having an upper portion forming a groove.

4. The weather strip as defined in claim 3, wherein said sealing portion and said engagement portion of said first weather strip section is sponge rubber and the second weather strip section is semi-hard rubber.

5. The weather strip as defined in claim 3 wherein the first weather strip section operates to seal along the door pillar and the second weather strip section operates to seal along the roof and the groove operates to guide rainwater away from the roof.

6. A single length weather strip for use on an automobile body to seal the clearance formed between an automobile door and the door opening of the automobile body, comprising first and second weather strip sections integrally formed as a single unit, each of said first and said second weather strip section including a sealing portion to seal said clearance and an engagement portion for engagement with the body, said sealing portion and said engagement portion of each of said first and second weather strip section materials having different hardness, said sealing portion of said first weather strip section includes an upper substantially oval cross-sectional configuration, and the sealing portion of said second weather strip section includes a substantially rectangular cross-sectional configuration with an upper portion forming a groove, the sealing portion and said engagement portion of said first weather strip section is sponge rubber, and said second weather strip section is heat treated sponge rubber having a hardness of semi-hard rubber.

7. An elongated weather strip for use on an automobile body to seal the clearance formed between an automobile door and the door opening of the body, comprising a first and a second weather strip section integrally formed as a single unit, each of said first and second weather strip sections including a sealing portion to seal said clearance and an engagement portion to be engaged with the body, said sealing portion and said engagement portion of each of said first and second weather strip sections having a different hardness, said sealing portion of the first weather strip section having a cross-sectional configuration which differs from the sealing portion of the second weather strip section, and said sealing portion of the second weather strip section having a heat treated portion of which the hardness is greater than the hardness of the sealing portion of the first weather strip section.

* * * * *